L. Dorr,
Diamond Stone Drill.
Nº 52,148.            Patented Jan. 23, 1866.
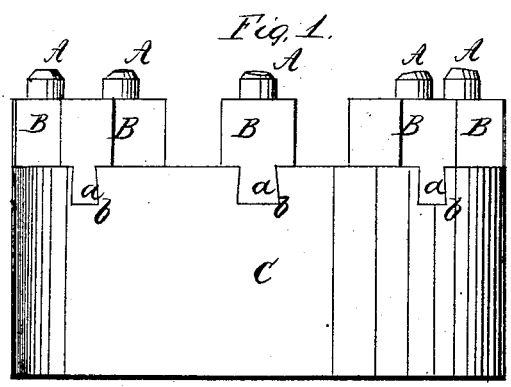
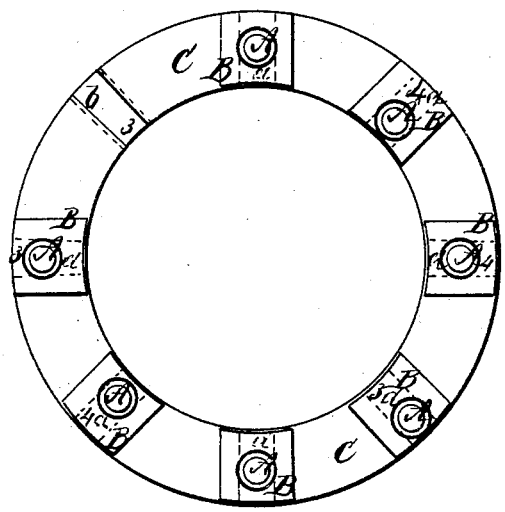

UNITED STATES PATENT OFFICE.

LORENZO DOW, OF PIERMONT, NEW YORK.

IMPROVEMENT IN BORING AND DRILLING TOOLS.

Specification forming part of Letters Patent No. 52,148, dated January 23, 1866; antedated January 10, 1866.

*To all whom it may concern:*

Be it known that I, LORENZO DOW, of Piermont, in the county of Rockland and State of New York, have invented a new and useful Improvement in Tools for Boring or Drilling Stone and other Hard Substances; and I do hereby declare that the following is a full, clear, and exact description of the same.

This invention relates more especially to the boring or drilling tool having its cutters composed of diamonds or other hard stones which is the subject-matter of Letters Patent of the United States granted to Rodolphe Leschot, July 14, 1863, but it is applicable to all boring and drilling tools in which diamonds or other hard stones are used for the cutting-edges. A great difficulty which has had to be contended with in the manufacture of this tool has been that of securing the cutters in the stock. The method heretofore adopted has been to fasten them into settings of copper or other ductile metal or alloy, and to solder or braze these settings into seats provided for their reception in the face of the annular steel stock; and it frequently occurs in the use of this method that the heat to which the stock is subjected in soldering in one cutter will loosen one which had previously been soldered in.

With a view to obviate this difficulty and to secure the cutters firmly in the stock, my invention consists in soldering or brazing the cutters into separate removable blocks of steel made with dovetail tongues and inserted into dovetail grooves in the stock, or otherwise attached to the stock in a suitable manner.

To enable others to construct boring or drilling tools according to my invention, I will proceed to describe it with reference to the accompanying drawings, in which—

Figure 1 is a side view of the cutter-stock and cutters, representing them in an inverted position. Fig. 2 is a face view of the same.

Similar letters of reference indicate corresponding parts in both figures.

A A are the cutters, of diamond or other hard stone. B B are the removable blocks, of steel or other hard metal, into which the said cutters are soldered or brazed, and C is the annular stock into which the said blocks are secured. The blocks B B are made with dovetail tongues *a a*, which are fitted to grooves *b* cut radially across the face of the stock C.

The cutters A A, having been first secured in a thin setting of copper or other ductile metal in the usual manner, are secured into the cavities or seats drilled or otherwise provided in the faces of the blocks B B by inserting and soldering or glazing their aforesaid settings thereinto while the said blocks are detached from the stock C, and when the said blocks have had the cutters thus secured in them their dovetail tongues *a a* are inserted into their respective grooves *b b* in the face of the stock.

As it is difficult, if not impracticable, to obtain diamonds or other sufficiently-hard stones large enough to make cutters wide enough to take singly the whole width of cut required, and perhaps not desirable to do so, the several cutters are set at different distances from the center of the stock, to cut in circles of greater or less radius. The cutters being so set, those which are nearer the inner circumference of the annular stock cut more at their outer sides or edges, and are subject in their operation to an outward pressure in a direction from the axis of the stock, and those which are nearer the outer circumference of the stock are subject to an inward pressure toward the axis thereof. This being the case, the dovetail tongues provided on the blocks of the last-mentioned cutters and the grooves provided in the stock for their reception are tapered inward toward the axis of the stock, as shown at 3 3 in Fig. 2, and the tongues provided on the blocks of the first-mentioned cutters and the grooves provided in the stock for their reception are tapered outward from the axis of the stock, as shown at 4 4 in the same figure, and in this way all of the said blocks and cutters are sustained against the pressure toward or from the axis; but those cutters which are set in about the middle of the face of the stock, like those at the top and bottom of Fig. 2, being subject to no greater or less pressure toward than from the axis of the stock, have the tongues of their receiving-blocks and the grooves provided in the stock for the reception of the said tongues parallel in a direction toward and from the axis of the stock.

The removable blocks B B afford facility for the repair or replacement of any one or more of the cutters without any danger of disturbing the others.

Instead of the blocks B B being dovetailed into the stock, they might be screwed in.

What I claim as my invention, and desire to secure by Letters Patent, is—

Attaching the diamonds or other stones which constitute the cutters of the boring-tool to the stock by soldering, brazing, or otherwise securing the settings of the said stones into removable blocks of steel or other hard metal, which are dovetailed or otherwise secured in the stock, substantially as herein described.

LORENZO DOW.

Witnesses:
HENRY T. BROWN,
J. W. COOMBS.